United States Patent [19]

Cantatore

[11] Patent Number: 4,547,548

[45] Date of Patent: Oct. 15, 1985

[54] POLYMERIC COMPOUNDS CONTAINING PIPERIDINE AND TRIAZINE RADICALS, PROCESS FOR THEIR PREPARATION, AND THEIR USE AS STABILIZERS FOR SYNTHETIC POLYMERS

[75] Inventor: Giuseppe Cantatore, Bitonto, Italy

[73] Assignee: Ciba-Geigy S.p.A., Origgio, Italy

[21] Appl. No.: 633,424

[22] Filed: Jul. 19, 1984

[30] Foreign Application Priority Data

Jul. 19, 1983 [IT] Italy .............................. 22137 A/83

[51] Int. Cl.$^4$ .......................................... C08L 23/121
[52] U.S. Cl. .................................. 525/186; 525/399; 525/400; 525/420; 525/424; 525/437; 525/440; 525/454; 525/467; 525/528; 525/533; 528/68; 528/341; 528/421; 260/243.3; 544/83; 544/113; 544/198; 544/209
[58] Field of Search .................. 524/97, 101, 103, 99; 525/186, 399, 400, 420, 424, 437, 440, 454, 528, 533, 467; 528/341, 68, 421; 260/243.3; 544/83, 113, 198, 209

[56] References Cited

U.S. PATENT DOCUMENTS 4,086,204  4/1978  Cassandrini et al. ............... 524/100
4,104,248  8/1978  Cantatore ............................ 525/529

*Primary Examiner*—Theodore E. Pertilla
*Attorney, Agent, or Firm*—Wenderoth, Lind & Ponack

[57] ABSTRACT

Polycondensation compounds containing piperidine and triazine groups, having a mean molecular weight from 1000 to 20,000 and constituted by structural units a and b of the formula

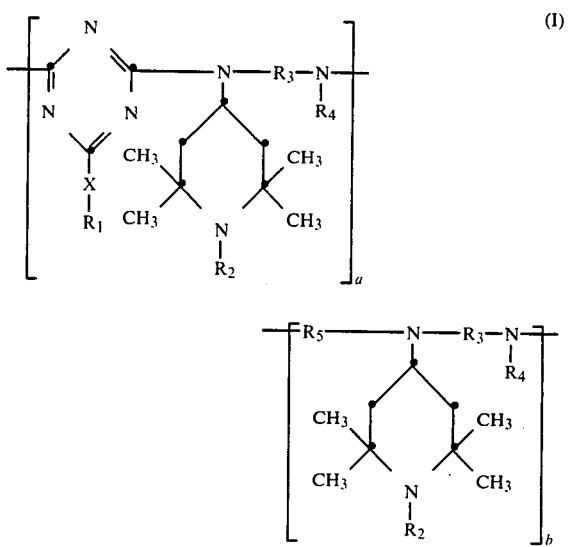

are suitable as anti-actinic stabilizers for incorporation in polymeric materials.

6 Claims, No Drawings

POLYMERIC COMPOUNDS CONTAINING PIPERIDINE AND TRIAZINE RADICALS, PROCESS FOR THEIR PREPARATION, AND THEIR USE AS STABILIZERS FOR SYNTHETIC POLYMERS

The present invention relates to a novel class of polymeric compounds containing piperidine groups, which compounds can be used as light stabilisers, heat stabilisers and oxidation stabilisers for synthetic polymers. It is known that synthetic polymers undergo a progressive change in their physical properties, like a loss of mechanical strength and colour changes, when they are exposed to sunlight or other sources of ultraviolet light.

To retard the deleterious effect of sunlight on synthetic polymers, the use of various additives having light-stabilising properties has been proposed.

Some of these possess notable effectiveness in articles of large thickness, but in objects with a large surface development, such as tapes, fibres and films, they are hardly useful, since they have a strong tendency to volatilisation and to extraction by water, either during the production process itself or in use.

For an effective light-stabilisation of articles with a large specific surface area, the use of stabilisers of a polymeric nature has been suggested, because they are notably resistant to volatilisation and extraction, due to their relatively high molecular weight. Some of these products also show a notable effectiveness as light-stabilisers; in particular, polytriazine compounds containing, for example, the compound of the formula

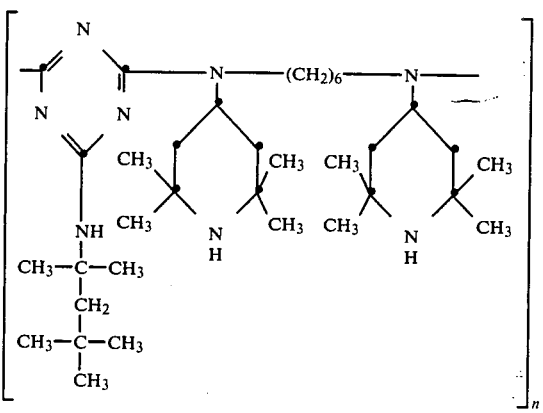

have been disclosed in U.S. Pat. No. 4,086,204; in U.S. Pat. No. 4,104,248, polyamines containing, for example, the compound of the formula

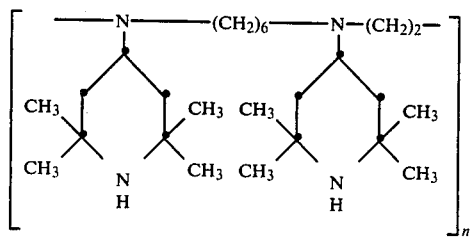

have been disclosed as stabilisers for polyolefines; in the EP Patent Application No. 45721, piperidyl derivatives of triazinyl copolymers containing, for example, the compound of formula

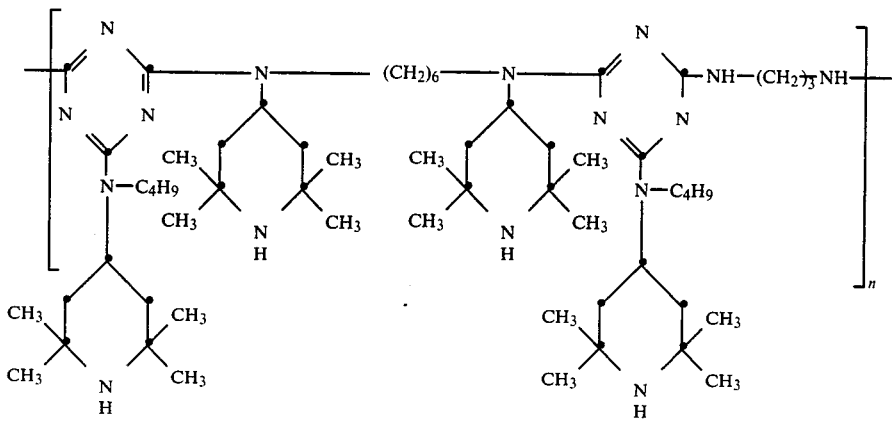

have also been disclosed as stabilisers for polyolefines.

The results obtained with the abovementioned products have, however, not been completely satisfactory, and a further improvement was therefore desirable.

The present invention relates to novel products of a polymeric nature, which contain piperidine radicals and have shown a surprising and unforeseeable higher activity as light-stabilisers for synthetic polymers, as compared with the products of the state of the art. The novel compounds are particularly useful for improving the light-stability of polyolefine fibres, tapes and films.

In particular, the present invention relates to novel compounds of the general formula (I)

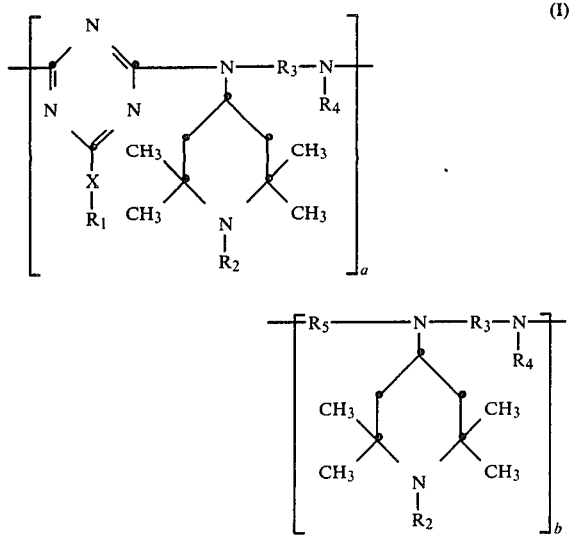

(I)

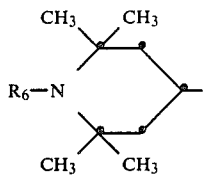

(II)

in which $R_1$ is hydrogen, $C_1$–$C_{18}$-alkyl, $C_2$–$C_{12}$-alkyl substituted by —OH, by $C_1$–$C_{18}$-alkoxy or by $C_2$–$C_{18}$-dialkylamino, or is $C_3$–$C_{18}$-alkenyl, $C_5$–$C_{18}$-cycloalkyl, $C_6$–$C_{18}$-aryl, $C_7$–$C_{18}$-aralkyl or a radical of the formula (II)

where $R_6$ is hydrogen, $C_1$–$C_{12}$-alkyl, $C_3$–$C_{12}$-alkenyl or alkynyl, $C_7$–$C_{12}$-aralkyl or $C_1$–$C_{12}$-acyl, X is —O—, —S— or a radical

in which $R_7$ is as defined for $R_1$, $R_1X$ taken as a single substituent group can also be a heterocyclic radical, such as pyrrolidin-1-yl, piperidin-1-yl, hexahydroazepin-1-yl, morpholin-4-yl or 4-methyl-piperazin-1-yl, $R_2$ is as defined for $R_6$, $R_3$ is $C_2$–$C_{18}$-alkylene, $C_4$–$C_{18}$-alkylene substituted by 1 or 2 oxygen or nitrogen atoms, $C_5$–$C_{18}$-cycloalkylene, $C_6$–$C_{18}$-arylene or $C_7$–$C_{18}$-aralkylene, $R_4$ is $C_5$–$C_{18}$-cycloalkyl, $C_6$–$C_{18}$-aryl, $C_7$–$C_{18}$-aralkyl or a radical of the formula (II), and $R_5$ is $C_3$–$C_{18}$-hydroxyalkylene, $C_4$–$C_{18}$-alkenylene, $C_8$–$C_{18}$-aralkylene, carbonyl, $C_2$–$C_{18}$-diacyl, $C_4$–$C_{18}$-dicarbamoyl, $C_1$–$C_{18}$-alkylene-carbonyl or a radical of the formula (III)

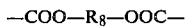 (III)

in which $R_8$ is $C_2$–$C_{18}$-alkylene, $C_4$–$C_{18}$-oxaalkylene, $C_6$–$C_{18}$-cycloalkylene, $C_6$–$C_{18}$-arylene or $C_8$–$C_{18}$-aralkylene.

In the compounds of the formula (I), the ratio a:b is between 4:1 and 1:4, and the number average molecular weight $\overline{M}n$ is between 1000 and 20,000.

Illustrative examples of the meanings of the various radicals in the formula (I) are as follows: for $R_1$ and $R_7$: hydrogen, methyl, ethyl, propyl, isopropyl, butyl, but-2-yl, isobutyl, hexyl, 2-ethylhexyl, octyl, decyl, dodecyl, hexadecyl, octadecyl, 2-hydroxyethyl, 3-hydroxypropyl, 2-methoxyethyl, 2-ethoxyethyl, 3-methoxypropyl, 3-ethoxypropyl, 3-octyloxypropyl, 3-dodecyloxypropyl, 3-octadecyloxypropyl, 3-dimethylaminopropyl, 3-diethylaminopropyl, 4-diethylaminobutyl, allyl, methallyl, but-2-enyl, undec-10-enyl, oleyl, cyclohexyl, methylcyclohexyl, trimethylcyclohexyl, cyclooctyl, cyclododecyl, phenyl, methylphenyl, dimethylphenyl, trimethylphenyl, t-butylphenyl, t-octylphenyl, methoxyphenyl, ethoxyphenyl, 3,5-di-t-butyl-4-hydroxyphenyl, benzyl, methylbenzyl, hydroxybenzyl, 3,5-di-t-butyl-4-hydroxybenzyl, 2,2,6,6-tetramethyl-piperidin-4-yl, 1,2,2,6,6-pentamethyl-piperidin-4-yl, 1-allyl-2,2,6,6-tetramethyl-piperidin-4-yl, 1-benzyl-2,2,6,6-tetramethyl-piperidin-4-yl and 1-acetyl-2,2,6,6-tetramethyl-piperidin-4-yl; for $R_2$ and $R_6$: hydrogen, methyl, ethyl, propyl, butyl, hexyl, octyl, decyl, dodecyl, allyl, methallyl, but-2-enyl, hex-2-enyl, propargyl, benzyl, methylbenzyl, t-butylbenzyl, hydroxybenzyl, acetyl, propionyl, butyryl, caproyl and benzoyl; for $R_3$: ethylene, 1,2-propylene, trimethylene, pentamethylene, tetramethylene, 2,2-dimethylpropane-1,3-diyl, hexamethylene, decamethylene, dodecamethylene, cyclohexylene, cyclohexylenedimethylene, phenylene, xylylene, 3-oxapentane-1,5-diyl, 4-oxaheptane-1,7-diyl, 4,9-dioxadodecane-1,12-diyl, iminodiethylene, iminodipropylene and methyliminodipropylene; for $R_4$: cyclohexyl, methylcyclohexyl, 3,3,5-trimethylcyclohexyl, cyclooctyl, cyclododecyl, phenyl, methylphenyl, dimethylphenyl, trimethylphenyl, butylphenyl, t-octylphenyl, methoxyphenyl, ethoxyphenyl, 3,5-di-t-butyl-4-hydroxyphenyl, benzyl, methylbenzyl, hydroxybenzyl, 3,5-di-t-butyl-4-hydroxybenzyl, 2,2,6,6-tetramethylpiperidin-4-yl, 1,2,2,6,6-pentamethyl-piperidin-4-yl, 1-allyl-2,2,6,6-tetramethylpiperidin-4-yl, 1-benzyl-2,2,6,6-tetramethyl-piperidin-4-yl and 1-acetyl-2,2,6,6-tetramethyl-piperidin-4-yl; and for $R_5$: 2-hydroxypropane-1,3-diyl, 2-butene-1,4-diyl, xylylene, carbonyl, oxalyl, malonyl, succinyl, glutaryl, adipoyl, sebacoyl, isophthaloyl, terephthaloyl, an aliphatic $C_4$–$C_{10}$-dicarbamoyl or aromatic $C_6$–$C_{14}$-dicarbamoyl, a radical of the formula —$(CH_2)_n$—CO—, where n is from 1 to 12, or a radical of the formula (III), in which $R_8$ is ethylene, 1,2-propylene, trimethylene, tetramethylene, 2,2-dimethylpropane-1,3-diyl, hexamethylene, decamethylene, dodecamethylene, 3-oxapentane-1,5-diyl, cyclohexylene, cyclohexylenedimethylene, phenylene or xylylene.

Those compounds of the formula (I) are preferred in which X is —O— or

$R_1$ and $R_7$, which can be identical or different, are hydrogen, $C_1$–$C_{12}$-alkyl, $C_3$–$C_6$-alkenyl, $C_6$–$C_{10}$-cycloalkyl or a radical of the formula (II) in which $R_6$ is hydrogen, methyl, allyl, benzyl or acetyl, $R_1X$— taken as a single substituent group is pyrrolidin-1-yl, piperidin-1-yl, hexahydroazepin-1-yl or morpholin-4-yl, $R_2$ is as defined above for $R_6$, $R_3$ is $C_2$–$C_{12}$-alkylene, $C_6$–$C_{14}$-cyclohexylene, phenylene or xylylene, $R_4$ is $C_6$–$C_{10}$-cycloalkyl or a radical of the formula (II) as defined above, and $R_5$ is 2-hydroxypropane-1,3-diyl, xylylene, $C_2$–$C_{12}$-diacyl, $C_4$–$C_{12}$-dicarbamoyl, a radical —$(CH_2$-

)$_r$—CO— with r from 1 to 6 or a radical —COO—(CH$_2$)$_s$—OOC— with s from 2 to 6, the ratio a:b being between 3:1 and 1:3 and the number average molecular weight $\overline{M}$n being between 1500 and 10,000.

Those compounds of the formula (I) are particularly preferred in which X is —O— or

R$_1$ and R$_7$, which can be identical or different, are hydrogen, C$_1$–C$_8$-alkyl, cyclohexyl, 2,2,6,6-tetramethyl-piperidin-4-yl or 1,2,2,6,6-pentamethyl-piperidin-4-yl, R$_1$X— taken as a single substituent group is piperidin-1-yl, hexahydroazepin-1-yl or morpholin-4-yl, R$_2$ and R$_6$ are hydrogen or methyl, R$_3$ is C$_2$–C$_6$-alkylene, R$_4$ is cyclohexyl, 2,2,6,6-tetramethyl-piperidin-4-yl or 1,2,2,6,6-pentamethyl-piperidin-4-yl and R$_5$ is 2-hydroxypropane-1,3-diyl, xylylene, C$_2$–C$_{10}$-diacyl, C$_6$–C$_{12}$-dicarbamoyl or the radical —CH$_2$CO—, the ratio a:b being between 3:1 and 1:3 and the number average molecular weight $\overline{M}$n being between 1500 and 6000.

The compounds of the formula (I) can be prepared by reacting a compound of the formula (IV)

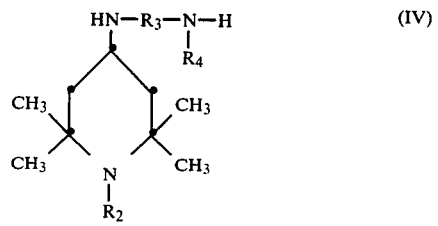

in which R$_2$, R$_3$ and R$_4$ are as defined above, with compounds of the formulae (V) and (VI)

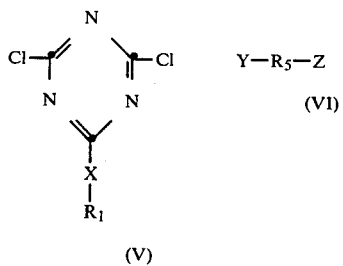

in which X, R$_1$ and R$_5$ are as defined above, and Y and Z are chlorine, bromine, a radical —NCO, methoxy or ethoxy or together with R$_5$ represent epichlorohydrin, in an inert organic solvent and in the presence of an organic or inorganic base at a temperature of between 50° and 250° C., preferably between 80° and 180° C., in a molar ratio of the compound of the formula (IV): compound (V)+compound (VI) between 1.3:1 and 1:1.3, preferably between 1.2:1 and 1:1.

As the reaction medium, organic solvents can be employed, for example benzene, toluene, xylene, ethylbenzene, trimethylbenzene, tetralin, decalin, methanol, ethanol, isopropanol, n-butanol, 2-butanol, isobutanol, n-pentanol, isopentanol, t-pentanol, n-hexanol, 4-methyl-2-pentanol, 2-methoxyethanol, 2-ethoxyethanol, 2-butoxyethanol, tetrahydrofuran, dioxane, dibutyl ether, 1,2-dimethoxyethane, 1,2-diethoxyethane, diethylene glycol dimethyl ether, diethylene glycol diethyl ether, N,N-dimethylformamide, N,N-dimethylacetamide, N-methylpyrrolidone and dimethyl sulfoxide.

In order to fix the hydrohalic acid liberated in the process, the reaction is carried out in the presence of organic or inorganic bases, for example pyridine, triethylamine, tributylamine, sodium hydroxide, potassium hydroxide, sodium carbonate or potassium carbonate; in every case, the base is employed in a quantity at least equivalent to the hydrohalic acid liberated in the reaction.

The two reagents (V) and (VI) can be reacted with the compounds of the formula (IV) either simultaneously or separately; if the reagent (VI) is a diester, a diacyl chloride, a diisocyanate, a halogenoalkyl halide or a bis-chloroformate, it is preferable to react the compound of the formula (IV) first with the dichlorotriazine (V) and subsequently with the reagent (VI).

The compounds of the formula (V) can be prepared by procedures known for the reaction of cyanuric chloride with compounds of the formula R$_1$XH in an inert organic solvent in the presence of an organic or inorganic base; the dichlorotriazines obtained can be employed directly without isolation from the reaction mixture, or after isolation.

In order to illustrate the present invention more clearly the preparation of several compounds of the formula (I) is described in Examples 1 to 18, which are given solely by way of illustration and do not imply any restriction.

As mentioned at the outset, the compounds of the formula (I) are very effective in improving the light stability, heat stability and oxidation stability of synthetic polymers, for example high-density and low-density polyethylene, polypropylene, ethylene/propylene copolymers, ethylene/vinyl acetate copolymers, polybutadiene, polyisoprene, polystyrene, butadiene/styrene copolymers, vinyl chloride/vinylidene chloride polymers and copolymers, polyoxymethylene, polyurethanes, saturated and unsaturated polyesters, polyamides, polycarbonates, polyacrylates, alkyd resins and epoxide resins.

The compounds of the formula (I) can be mixed with the synthetic polymers in various proportions depending on the nature of the polymer, the end use and the presence of other additives. In general, it is advantageous to employ from 0.01 to 5% by weight of the compounds of the formula (I), relative to the weight of the polymers, preferably from 0.05 to 1%.

The compounds of the formula (I) can be incorporated into the polymeric materials by various processes, such as dry blending in the form of powders, or wet mixing in the form of solutions or suspensions, or mixing in the form of a master batch; in these operations, the synthetic polymer can be employed in the form of a powder, granules, a solution or a suspension or in the form of a latex.

The polymers stabilised with the products of the formula (I) can be used for the preparation of moulded articles, films, tapes, fibres, monofilaments, surface coatings and the like.

If appropriate, other additives, such as antioxidants, ultraviolet absorbers, nickel stabilisers, pigments, fillers, plasticisers, antistatic agents, flameproofing agents, lubricants, anti-corrosion agents and metal deactivators, can be added to the mixtures of the compounds of the formula (I) with the synthetic polymers.

Examples of additives which can be mixed with the compounds of the formula (I) are, in particular:

Phenolic antioxidants, for example 2,6-di-t-butyl-p-cresol, 4,4'-thio-bis-(3-methyl-6-t-butyl-phenol), 1,1,3-tris-(2-methyl-4-hydroxy-5-t-butylphenyl)-butane, octadecyl 3-(3,5-di-t-butyl-4-hydroxyphenyl)-propionate, pentaerythritol tetrakis-3-(3,5-di-t-butyl-4-hydroxyphenyl)-propionate, tris-(3,5-di-t-butyl-4-hydroxybenzyl)isocyanurate, tris-(4-t-butyl-3-hydroxy-2,6-dimethylbenzyl)isocyanurate and calcium monoethyl 3,5-di-t-butyl-4-hydroxybenzylphosphonate;

Secondary antioxidants, such as esters of thiodipropionic acid, for example, di-n-dodecyl thiodipropionate and di-n-octadecyl thiodipropionate; aliphatic sulfides and disulfides, for example di-n-dodecyl sulfide, di-n-octadecyl sulfide and di-n-octadecyl disulfide; aliphatic, aromatic or aliphatic-aromatic phosphites and thiophosphites, for example tri-n-dodecyl phosphite, tris-(nonylphenyl)phosphite, tri-n-dodecyl trithiophosphite, phenyl di-n-decyl phosphite, di-n-octadecyl pentaerythritol diphosphite, tris-(2,4-di-t-butylphenyl)phosphite and tetrakis-(2,4-di-t-butylphenyl) 4,4'-biphenylenediphosphonite;

Ultraviolet absorbers, for example 2-hydroxy-4-n-octyloxybenzophenone, 2-hydroxy-4-n-dodecyloxybenzophenone, 2-(2-hydroxy-3,5-di-t-butylphenyl)-5-chlorobenzotriazole, 2-(2-hydroxy-3,5-di-t-amylphenyl)-benzotriazole, 2,4-di-t-butylphenyl 3,5-di-t-butyl-4-hydroxybenzoate, hexadecyl 3,5-di-t-butyl-4-hydroxybenzoate, phenyl salicylate, p-t-butylphenyl salicylate, 2-ethoxy-2'-ethyl-oxanilide, 2-ethoxy-5-t-butyl-2'-ethyl-oxanilide and 2-ethoxy-2'-ethyl-5,5'-di-t-butyl-oxanilide;

Hindered amine-type light stabilisers, for example 2,2,6,6-tetramethyl-piperidin-4-yl benzoate, bis-(2,2,6,6-tetramethylpiperidin-4-yl) sebacate, bis-(1,2,2,6,6-pentamethylpiperidin-4-yl) sebacate, bis-(1,2,2,6,6-pentamethylpiperidin-4-yl) butyl-3,5-di-t-butyl-4-hydroxybenzylmalonate, piperidinyl derivatives of triazine polymers of the type described in U.S. Pat. No. 4,086,204 and piperidine polyesters of the type described in U.S. Pat. No. 4,233,412, 2,2,4,4-tetramethyl-7-oxa-3,20-diazadispiro[5.1.11.2]heneicosan-21-one and 1,1'-ethylene-bis-(3,3,5,5-tetramethyl-piperazinone);

Light stabilisers based on nickel, for example Ni monoethyl 3,5-di-t-butyl-4-hydroxybenzyl-phosphonate, the butylamine-Ni 2,2'-thio-bis-(4-t-octylphenolate) complex, Ni 2,2'-thio-bis-(4-t-octylphenolphenolate), Ni dibutyl-dithiocarbamate, Ni 3,5-di-t-butyl-4-hydroxybenzoate and the Ni complex of 2-hydroxy-4-n-octyloxybenzophenone;

Organo-tin stabilisers, for example dibutyl-tin maleate, dibutyl-tin laurate and dioctyl-tin maleate;

Acrylic esters, for example α-cyano-β,β-diphenylacrylate and methyl α-cyano-β-methyl-4-methoxycinnamate;

Metal salts of higher fatty acids, for example calcium stearate, barium stearate, cadmium stearate, zinc stearate, lead stearate, nickel stearate, magnesium behenate, calcium behenate, barium behenate, zinc behenate, calcium laurate, cadmium laurate, zinc laurate and barium laurate;

Organic and inorganic pigments, for example Colour Index Pigment Yellow 37, Colour Index Pigment Yellow 83, Colour Index Pigment Red 144, Colour Index Pigment Red 48:3, Colour Index Pigment Blue 15, Colour Index Pigment Green 7, titanium dioxide, iron oxide and the like.

The efficiency, as stabilisers, of the products prepared according to the present invention is illustrated in Examples 19 and 20 which follow, in which some of the products obtained in the preparation examples are employed for stabilising tapes and fibres of polypropylene.

EXAMPLE 1

22.1 g (0.1 mol) of 2,4-dichloro-6-diethylamino-1,3,5-triazine, 9.25 g (0.1 mol) of epichlorohydrin, 78.8 g (0.2 mol) of N,N'-bis-(2,2,6,6-tetramethyl-piperidin-4-yl)-hexamethylenediamine and 100 ml of 4-methyl-2-pentanol are heated under reflux for 10 hours, 12 g (0.3 mol) of sodium hydroxide being added slowly during the last 5 hours of reaction. After the addition of NaOH has been completed, the reaction mixture is heated under reflux for a further 2 hours and then evaporated to dryness; the reflux obtained is washed with water and dried.

This gives a resinous product melting at 104°–111° C. and having a number average molecular weight of $\overline{Mn} = 3400$.

EXAMPLES 2–11

Further compounds of the formula (I) are prepared by the procedure described in Example 1.

In the present application

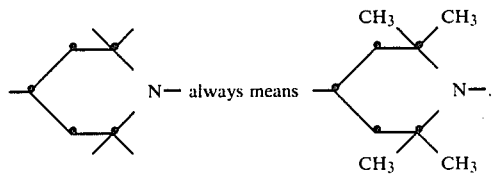

| Example No. | Reagents | Product | |
|---|---|---|---|
| | | $\overline{Mn}$ | M.p. |

-continued
| Example No. | Reagents | | | Product | |
|---|---|---|---|---|---|
| | | | | $\overline{M}_n$ | M.p. |
| 2 | 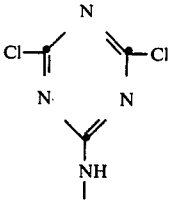 27.7 g (0.1 m) | CH₂—CHCH₂Cl \\O/ 9.25 g (0.1 m) | NH—(CH₂)₆—NH 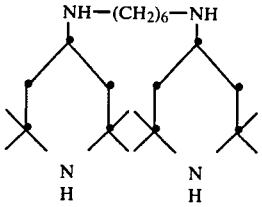 78.8 g (0.2 m) | 3920 | 102–110° C. |
| 3 |  27.7 g (0.1 m) | CH₂—CHCH₂Cl \\O/ 18.5 g (0.2 m) | NH—(CH₂)₆—NH 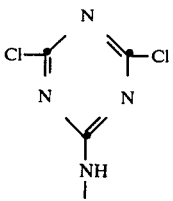 118.2 g (0.3 m) | 3550 | 86–99° C. |
| 4 | 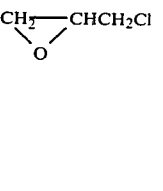 22.1 g (0.1 m) | CH₂—CHCH₂Cl \\O/ 18.5 g (0.2 m) | NH—(CH₂)₆—NH 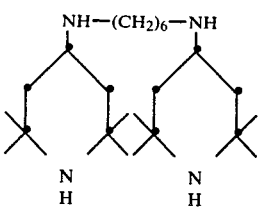 118.2 g (0.3 m) | 3900 | 88–116° C. |
| 5 | 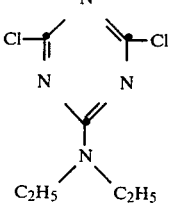 24.7 g (0.1 m) | CH₂—CHCH₂Cl \\O/ 9.25 g (0.1 m) | NH—(CH₂)₆—NH 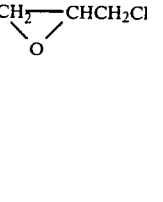 78.8 g (0.2 m) | 3580 | 105–120° C. |
| 6 | 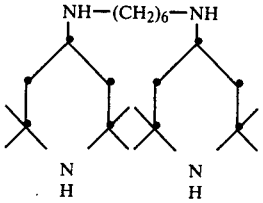 | CH₂—CHCH₂Cl \\O/ | NH—(CH₂)₆—NH 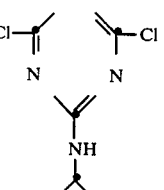 | 3540 | 100–108° C. |

-continued

| Example No. | Reagents | | | Product Mn | M.p. |
|---|---|---|---|---|---|
| | 24.7 g (0.1 m) | 18.5 g (0.2 m) | 118.2 g (0.3 m) | | |
| 7 | 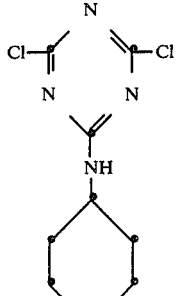 37.1 g (0.15 m) |  4.63 g (0.05 m) | 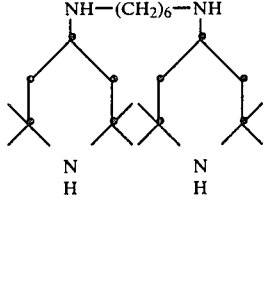 78.8 g (0.2 m) | 2640 | 122–150° C. |
| 8 | 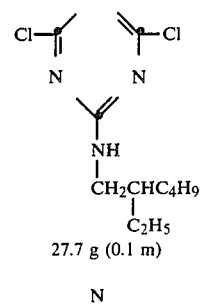 27.7 g (0.1 m) |  9.25 g (0.1 m) | 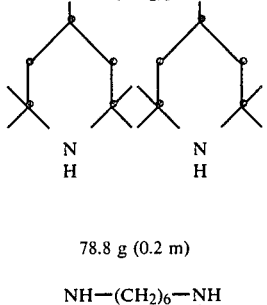 78.8 g (0.2 m) | 3000 | 75–85° C. |
| 9 | 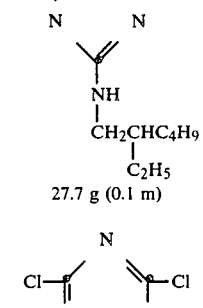 27.7 g (0.1 m) | 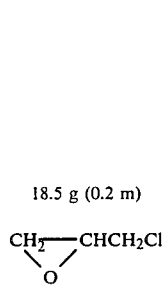 18.5 g (0.2 m) | 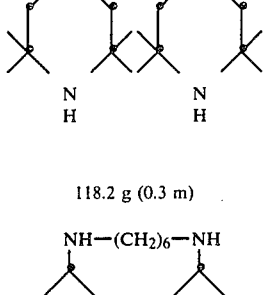 118.2 g (0.3 m) | 3230 | 67–75° C. |
| 10 | 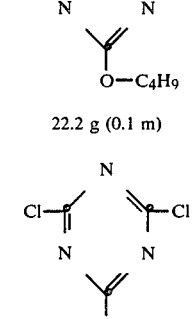 22.2 g (0.1 m) | 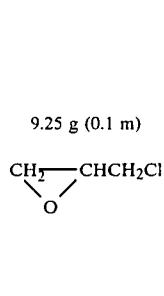 9.25 g (0.1 m) | 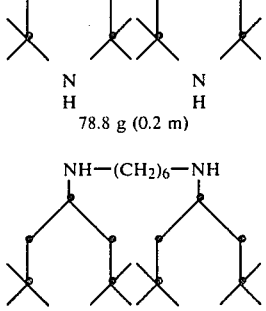 78.8 g (0.2 m) | 3000 | 70–85° C. |
| 11 | 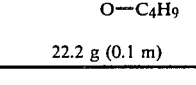 22.2 g (0.1 m) | 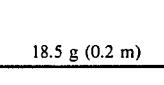 18.5 g (0.2 m) | 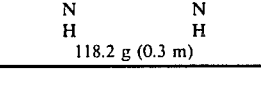 118.2 g (0.3 m) | 2920 | 66–85° C. |

EXAMPLE 12

78.8 g (0.2 mol) of N,N'-bis-(2,2,6,6-tetramethyl-piperidin-4-yl)-hexamethylenediamine, 22.1 g (0.1 mol) of 2,4-dichloro-6-diethylamino-1,3,5-triazine, 12 g of sodium hydroxide and 200 ml of xylene are heated under reflux for 20 hours, the water of reaction being separated off.

After cooling, the reaction mixture is diluted with 300 ml of xylene, filtered and evaporated to dryness.

13.2 g (0.1 mol) of dimethyl malonate are added to the residue thus obtained, and the mixture is heated to 160°-170° C. for 6 hours, the methanol liberated during the reaction being removed, and is finally heated for 3 hours to 200° C. in vacuo. This gives a solid resinous product melting at 135°-140° C. and having a number average molecular weight of $\overline{M}n=3560$.

EXAMPLE 13

Following the procedure described in Example 12, a compound analogous to the preceding one is prepared, replacing the 2,4-dichloro-6-diethylamino-1,3,5-triazine with 27.7 g (0.1 mol) of 2,4-dichloro-6-(2-ethylhexylamino)-1,3,5-triazine.

The compound obtained melts at 110°-118° C. and has a number average molecular weight of $\overline{M}n=3800$.

EXAMPLE 14

78.8 g (0.2 mol) of N,N'-bis-(2,2,6,6-tetramethylpiperidin-4-yl)-hexamethylenediamine, 27.7 g (0.1 mol) of 2,4-dichloro-6-(2-ethylhexylamino)-1,3,5-triazine, 12 g of sodium hydroxide and 200 ml of xylene are heated under reflux for 20 hours, the water of reaction being separated off.

After cooling, the reaction mixture is diluted with 300 ml of xylene, filtered and concentrated to half its volume.

16.8 g (0.1 mol) of hexamethylene diisocyanate are added, and the mixture is heated under reflux for 4 hours and then evaporated to dryness.

The product obtained melts at 143°-166° C. and has a number average molecular weight of $\overline{M}n=3700$.

EXAMPLE 15

A solution of 11.3 g (0.1 mol) of chloroacetyl chloride in 50 ml of xylene is added slowly, the temperature not exceeding 0° C., to a mixture, cooled to −10° C., of 78.8 g (0.2 mol) of N,N'-bis-(2,2,6,6-tetramethylpiperidin-4-yl)-hexamethylenediamine and 150 ml of xylene.

22.1 g (0.1 mol) of 2,4-dichloro-6-diethylamino-1,3,5-triazine and 20 g of sodium hydroxide are then added, and the mixture is heated under reflux for 20 hours, the water of reaction being separated off.

After filtration and evaporation of the solvent, a product melting at 63°-72° C. and having a number average molecular weight of $\overline{M}n=2000$ is obtained.

EXAMPLE 16

A solution of 24.2 g (0.1 mol) of 2,2,6,6-tetramethyl-4-(3-ethoxypropylamino)-piperidine in 30 ml of xylene is added slowly, maintaining the temperature between −10° and 0° C., to a solution, cooled to −10° C., of 18.5 g (0.1 mol) of cyanuric chloride in 150 ml of xylene.

At 0° C., a solution of 4 g of sodium hydroxide in 30 ml of water is added, the temperature being maintained at 0° C.

78.8 g (0.2 mol) of N,N'-bis-(2,2,6,6-tetramethylpiperidin-4-yl)-hexamethylenediamine and 9.25 g (0.1 mol) of epichlorohydrin are then added, and the mixture is heated under reflux for 15 hours, 16 g of sodium hydroxide being added during the last 5 hours of reflux.

After the addition of sodium hydroxide has been completed, the mixture is heated for a further 5 hours under reflux with azeotropic water removal and is finally filtered hot, and the filtrate is evaporated to dryness.

This gives a resinous product melting at 98°-108° C. and having a number average molecular weight of $\overline{M}n=2800$.

EXAMPLES 17 AND 18

Two further compounds of the formula (I) are prepared by the procedure described in Example 16:

| Example No. | Reagents (cyanuric chloride) | $R_1$—X—H | Y—$R_5$—Z | Diamine | Product $\overline{M}n$ | M.p. |
|---|---|---|---|---|---|---|
| | cyanuric chloride (2,4,6-trichloro-1,3,5-triazine) | | | NH—$R_3$—NH with $R_4$ on N, and N—$R_2$ piperidine | | |
| 17 | | NH—$C_4H_9$ tetramethylpiperidine, 18.5 g (0.1 m) | epichlorohydrin CH$_2$—CHCH$_2$Cl (epoxide), 21.2 g (0.1 m) | NH—(CH$_2$)$_3$—NH bis(tetramethylpiperidinyl), 9.25 g (0.1 m) / 59.1 g (0.2 m) | 1800 | 115–122° C. |
| 18 | | O-tetramethylpiperidine (4-oxo), 18.5 g (0.1 m) | CH$_2$—CHCH$_2$Cl (epoxide) | NH—(CH$_2$)$_3$—NH bis(tetramethylpiperidinyl) NH | 2000 | 119–123° C. |

| Example | | | | Product | |
|---|---|---|---|---|---|
| No. | Reagents | | | $\overline{Mn}$ | M.p. |
| | 18.5 g (0.1 m) | 8.6 g (0.1 m) | 9.25 g (0.1 m) | 70.4 g (0.2 m) | |

EXAMPLE 19

2 g of each of the products indicated in Table 1, 1 g of pentaerythrol tetrakis-3-(3,5-di-t-butyl-4-hydroxyphenyl)-propionate and 1 g of calcium stearate are mixed in a powder mixer with 1,000 g of polypropylene powder of melt index 2.4 (Propathene HF 18, product of Imperial Chemical Industries).

The mixtures obtained are extruded at a temperature of 180°–220° C. to obtain polymer granules, which are then converted into stretched tapes of 50 μm thickness and 2.5 mm width, under the following working conditions:

Extruder temperature: 220°–240° C.
Head temperature: 240° C.
Stretch ratio: 1:6

The tapes thus prepared are exposed, mounted on a white card, in a model 65 WR Weather-Ometer (ASTM G 27-70) with a black panel temperature of 63° C.

Samples are taken after various times of exposure to light, and the residual tenacity of these samples is measured by means of a constant-speed tensometer; the exposure time in hours ($T_{50}$) needed to halve the initial tenacity is then calculated.

For comparison, polypropylene tapes prepared under the same conditions as indicated above, but without the addition of the compounds according to the invention, are exposed.

The results obtained are shown in Table 1:

TABLE 1

| Stabiliser | $T_{50}$ (hours) |
|---|---|
| none | 230 |
| Compound of Example 1 | 2080 |
| Compound of Example 3 | 1910 |
| Compound of Example 4 | 1890 |
| Compound of Example 6 | 2060 |
| Compound of Example 7 | 1800 |
| Compound of Example 11 | 2060 |
| Compound of Example 15 | 1960 |

EXAMPLE 20

2.5 g of each of the products indicated in Table 2, 1 g of octadecyl 3-(3,5-di-t-butyl-4-hydroxyphenyl)-propionate, 1 g of calcium stearate and 2.5 g of titanium dioxide (KRONOS RN 57) are mixed in a powder mixer with 1,000 g of polypropylene powder of melt index 13 (Propathene HF 85, a product of Imperial Chemical Industries). The mixtures are extruded at 180°–220° C. to obtain polymer granules which are then converted into fibres, under the following working conditions:

Extruder temperature: 220°–240° C.
Spinneret temperature: 240° C.
Stretch ratio: 1:3.5
Count: 20 deniers per fibre The fibres thus prepared are exposed, mounted on a white card, in a model 65 WR Weather-Ometer with a black panel temperature of 63° C.

The value of $T_{50}$ is then calculated as described in the preceding example.

For comparison, the result obtained with fibres prepared under the same conditions as described above, but without the addition of compounds according to the invention, is also given.

The results obtained are shown in Table 2:

TABLE 2

| Stabiliser | $I_{50}$ (hours) |
|---|---|
| none | 120 |
| Compound of Example 1 | 1240 |
| Compound of Example 3 | 1390 |
| Compound of Example 4 | 1400 |
| Compound of Example 5 | 1350 |
| Compound of Example 6 | 1410 |
| Compound of Example 7 | 1300 |
| Compound of Example 8 | 1440 |
| Compound of Example 9 | 1550 |
| Compound of Example 10 | 1440 |
| Compound of Example 11 | 1470 |
| Compound of Example 12 | 1460 |
| Compound of Example 13 | 1670 |
| Compound of Example 15 | 1460 |

What is claimed is:

1. Compound of the general formula (I)

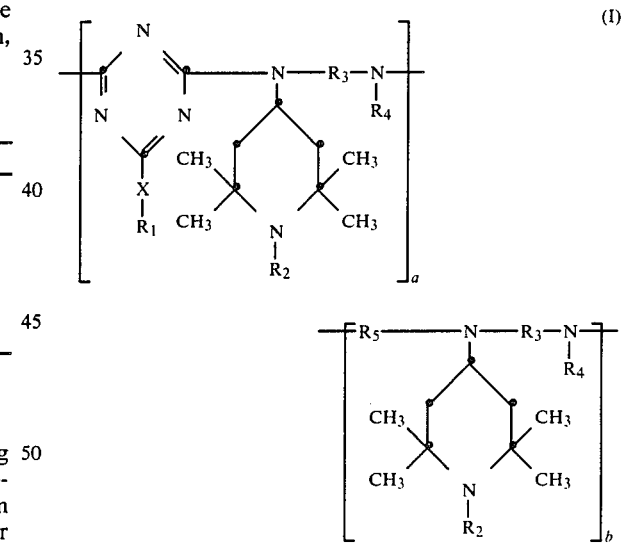

in which $R_1$ is hydrogen, $C_1$–$C_{18}$-alkyl, $C_2$–$C_{12}$-alkyl substituted by —OH, by $C_1$–$C_{18}$-alkoxy or by $C_2$–$C_{18}$-dialkylamino, or is $C_3$–$C_{18}$-alkenyl, $C_5$–$C_{18}$-cycloalkyl, $C_6$–$C_{18}$-aryl, $C_7$–$C_{18}$-aralkyl or a radical of the formula (II)

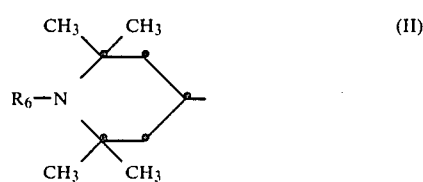

where $R_6$ is hydrogen, $C_1-C_{12}$-alkyl, $C_3-C_{12}$-alkenyl or alkynyl, $C_7-C_{12}$-aralkyl or $C_1-C_{12}$-acyl, X is —O—, —S— or a radical

in which $R_7$ is as defined for $R_1$, $R_1X$ taken as a single substituent group can also be a heterocyclic radical, such as pyrrolidin-1-yl, piperidin-1-yl, hexahydroazepin-1-yl, morpholin-4-yl or 4-methyl-piperazin-1-yl, $R_2$ is as defined for $R_6$, $R_3$ is $C_2-C_{18}$-alkylene, $C_4-C_{18}$-alkylene substituted by 1 or 2 oxygen or nitrogen atoms, $C_5-C_{18}$-cycloalkylene, $C_6-C_{18}$-arylene or $C_7-C_{18}$-aralkylene, $R_4$ is $C_5-C_{18}$-cycloalkyl, $C_6-C_{18}$-aryl, $C_7-C_{18}$-aralkyl or a radical of the formula (II), and $R_5$ is $C_3-C_{18}$-hydroxyalkylene, $C_4-C_8$-alkenylene, $C_8-C_{18}$-aralkylene, carbonyl, $C_2-C_{18}$-diacyl, $C_4-C_{18}$-dicarbamoyl, $C_1-C_{18}$-alkylene-carbonyl or a radical of the formula (III)

$$-COO-R_8-OOC- \quad (III)$$

in which $R_8$ is $C_2-C_{18}$-alkylene, $C_4-C_{18}$-oxaalkylene, $C_6-C_{18}$-cycloalkylene, $C_6-C_{18}$-arylene or $C_8-C_{18}$-aralkylene, the ratio a:b being between 4:1 and 1:4, and the number average molecular weight $\overline{M}n$ being between 1000 and 20,000.

2. Compound of the formula (I) according to claim 1 in which X is —O— or

$R_1$ and $R_7$, which can be identical or different, are hydrogen, $C_{1-12}$-alkyl, $C_3-C_6$-alkenyl, $C_6-C_{10}$-cycloalkyl or a radical of the formula (II) in which $R_6$ is hydrogen, methyl, allyl, benzyl or acetyl, $R_1X—$ taken as a single substituent group is pyrrolidin-1-yl, piperidin-1-yl, hexahydroazepin-1-yl or morpholin-4-yl, $R_2$ is as defined above for $R_6$, $R_3$ is $C_2-C_{12}$-alkylene, $C_6-C_{14}$-cyclohexylene, phenylene or xylylene, $R_4$ is $C_6-C_{10}$-cycloalkyl or a radical of the formula (II) as defined above, and $R_5$ is 2-hydroxypropane-1,3-diyl, xylylene, $C_2-C_{12}$-diacyl, $C_4-C_{12}$-dicarbamoyl, a radical —$(CH_2)_r$—CO— with r from 1 to 6 or a radical —COO—$(CH_2)_s$—OOC— with s from 2 to 6, the ratio a:b being between 3:1 and 1:3 and the number average molecular weight $\overline{M}n$ being between 1500 and 10,000.

3. Compound of the formula (I) according to claim 1, in which X is —O— or

$R_1$ and $R_7$, which can be identical or different, are hydrogen, $C_1-C_8$-alkyl, cyclohexyl, 2,2,6,6-tetramethylpiperidin-4-yl or 1,2,2,6,6-pentamethyl-piperidin-4-yl, $R_1X—$ taken as a single substituent group is piperidin-1-yl, hexahydroazepin-1-yl or morpholin-4-yl, $R_2$ and $R_6$ are hydrogen or methyl, $R_3$ is $C_2-C_6$-alkylene, $R_4$ is cyclohexyl, 2,2,6,6-tetramethyl-piperidin-4-yl or 1,2,2,6,6-pentamethyl-piperidin-4-yl and $R_5$ is 2-hydroxypropane-1,3-diyl, xylylene, $C_2-C_{10}$-diacyl, $C_6-C_{12}$-dicarbamoyl or the radical —$CH_2CO$—, the ratio a:b being between 3:1 and 1:3 and the number average molecular weight $\overline{M}n$ being between 1500 and 6000.

4. A light-stabilised, heat-stabilised and oxidation-stabilised polymer composition comprising a synthetic polymer and one or more stabilisers of the formula (I) according to claim 1 in a quantity from 0.01 to 5% by weight relative to the weight of the synthetic polymer.

5. A composition according to claim 4, which, in addition to the novel stabiliser of the formula (I), comprises other conventional additives for synthetic polymers.

6. A composition according to claim 4, wherein the synthetic polymer is polyethylene or polypropylene.

* * * * *